United States Patent
Lang et al.

(10) Patent No.: US 6,694,007 B2
(45) Date of Patent: Feb. 17, 2004

(54) SYSTEM AND METHOD FOR ESTABLISHING LONG DISTANCE CALL CONNECTIONS USING ELECTRONIC TEXT MESSAGES

(75) Inventors: Alexander C. Lang, Toronto (CA); Piotr Balcerzak, North York (CA)

(73) Assignee: Softalk Inc., Toronto (CA)

( * ) Notice: Subject to any disclaimer, the term of this patent is extended or adjusted under 35 U.S.C. 154(b) by 497 days.

(21) Appl. No.: 09/813,845

(22) Filed: Mar. 22, 2001

(65) Prior Publication Data

US 2002/0136390 A1 Sep. 26, 2002

(51) Int. Cl.[7] .......................... H04M 7/00; H04M 3/42; H04L 12/28; H04L 12/64; H04L 12/66
(52) U.S. Cl. ...................... 379/222; 370/352; 370/401; 379/201.01; 379/210.01; 379/900
(58) Field of Search .................. 370/352, 353, 370/354, 401; 379/201.01, 201.05, 201.12, 207.02, 210.01, 218.01, 218.02, 219, 220.01, 222, 900

(56) References Cited

U.S. PATENT DOCUMENTS

| | | | | |
|---|---|---|---|---|
| 6,188,683 B1 | | 2/2001 | Lang et al. ................. 370/352 |
| 6,192,123 B1 | * | 2/2001 | Grunsted et al. ........... 379/350 |
| 6,404,877 B1 | * | 6/2002 | Bolduc et al. ......... 379/218.01 |
| 6,408,062 B1 | * | 6/2002 | Cave ..................... 379/210.01 |
| 6,473,097 B1 | * | 10/2002 | Elliott ....................... 345/733 |
| 6,501,837 B1 | * | 12/2002 | Adler et al. ........... 379/210.01 |

* cited by examiner

*Primary Examiner*—Harry S. Hong
(74) *Attorney, Agent, or Firm*—Max R. Wood; Ogilvy Renault

(57) ABSTRACT

A method and system adapted to receive electronic text messages and generate connection request messages used to establish toll call connections. The system includes a call control database, customer profile database, billing database, call control node, and point of presence switch that interfaces with the PSTN. The electronic text messages are received through the Internet and may be electronic mail, short message service, or instant text messages.

29 Claims, 6 Drawing Sheets

SYSTEM AND METHOD FOR ESTABLISHING LONG DISTANCE CALL CONNECTIONS USING ELECTRONIC TEXT MESSAGES

CROSS-REFERENCE TO RELATED APPLICATIONS

This is the first application filed for the present invention.

MICROFICHE APPENDIX

Not applicable.

TECHNICAL FIELD

This invention relates to the provision of long distance service and, in particular, to a method and system for providing telephone service to customers who use electronic text messages to submit toll call service requests.

BACKGROUND OF THE INVENTION

The use of mobile communications devices and cellular telephones is growing rapidly as consumers are discovering the advantages of being accessible while commuting, or otherwise away from their office or home.

While many newer mobile communications devices, like the majority of wireless application protocol (WAP) phones, personal digital assistants (PDAs), and micro browsers, permit users to send and receive electronic text messages, such as electronic mail (e-mail), short text messages (SMS) and instant messages (IM), from virtually anywhere, the demand for voice communications has continued to rise. Despite the alternatives to voice calls, the speed and efficiency of feedback afforded by a voice call continues to be irreplaceable.

While the demand for voice communications using mobile communications devices is unabated, the cost of originating toll calls from mobile communications devices remains high. It is common practice for wireless telephone service providers to charge subscribers for all air-time, for "roaming", and for toll services, a premium long distance connection rate that is higher than rates paid for wireline toll calls. Roaming charges apply when a subscriber uses a mobile communications device outside of the subscriber's home area. In addition to the long distance rates charged to subscribers, it is also common practice for wireless service providers to bill roaming subscribers for "inbound" toll charges.

A premium is also paid by users of convenience telephones, such as hotel, airport, airplane, or resort telephones. Users of convenience telephones may be billed surcharges on all outgoing calls, incurring an expense substantially higher than the rate charged by the telephone service provider.

It is known in the prior art for a long distance service provider (LDSP) to provide long distance telephone services to customers by originating telephone calls in response to request messages sent through the Internet by the customer. Applicant's co-pending U.S. patent application Ser. No. 09/709,343, entitled A SYSTEM AND METHOD FOR ESTABLISHING LONG DISTANCE CALL CONNECTIONS USING A PERSONAL COMMUNICATIONS ASSISTANT, filed on Nov. 13, 2000, describes an exemplary method for initiating toll call connections from a Worldwide Web server. In accordance with that invention, a personal communications assistant (PCA) is used to initiate a toll connection by issuing a call request message that is sent through the Internet to the LDSP. The call request message is issued by a call completion application that resides in the PCA.

There are many mobile communications devices, such as certain wireless appliances and telephones, which are adapted to perform electronic text messaging, but not adapted to access other Internet services. Such devices are not provisioned to send Internet Protocol (IP) messages to initiate toll connections.

Moreover, many work environments permit employees to access e-mail or instant messaging, but do not allow Internet access. There are many situations in which customers who would like to request a toll call connection have access to e-mail, SMS or IM, but do not have access to a Worldwide Web browser.

There therefore remains a need for a method and system for receiving toll call connection requests contained in electronic text messages, and for effecting the connection requested using information contained in the electronic text message.

SUMMARY OF THE INVENTION

It is therefore an object of the present invention to provide a method and a system for receiving toll call connection requests contained in electronic text messages, and for effecting the connections requested.

It is another object of the invention to provide a system adapted to receive electronic text messages in one or more predefined formats, and to formulate toll connection request messages using information contained in the electronic text messages.

In accordance with the invention, registered customers can submit electronic text messages to a long distance service provider message server to initiate a Public Switched Telephone Network (PSTN) call. The electronic text message can conform to any of the popular text message formats, including electronic mail (email), short message service (SMS), and instant text messages (IM). The system permits calls to be established between substantially any two PSTN terminations. Consequently, customers to initiate calls that originate from cell phones or convenience phones, etc. while paying reduced toll call rates.

When an electronic text message is received, information contained in the message is extracted and used to generate a connection request that is sent to call completion equipment that effects the call. In order to facilitate use, the only information that is required to set up a two-party Plain Old Telephone Service (POTS) call is a call command and a destination number. The customer is identified using sender information extracted from the electronic text message. The originating number for the call is extracted from a customer profile. The potential for fraud is therefore reduced, while convenience is maximized.

On the other hand, utility is maximized by accommodating a complex message structure that permits calls to be scheduled, originating numbers added to the profile, billing codes specified and points of presence (POPs) to be specified in order to control costs when mobile equipment is used to originate calls.

The method and system in accordance with the invention therefore provides a simple, convenient and powerful mechanism for launching calls that can advantageously be used by millions of devices having access to an electronic text messaging service.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The invention provides a system for permitting toll calls to be originated using electronic text messages sent from any device adapted to send an electronic text message into the Internet.

System Overview

Figure 1:
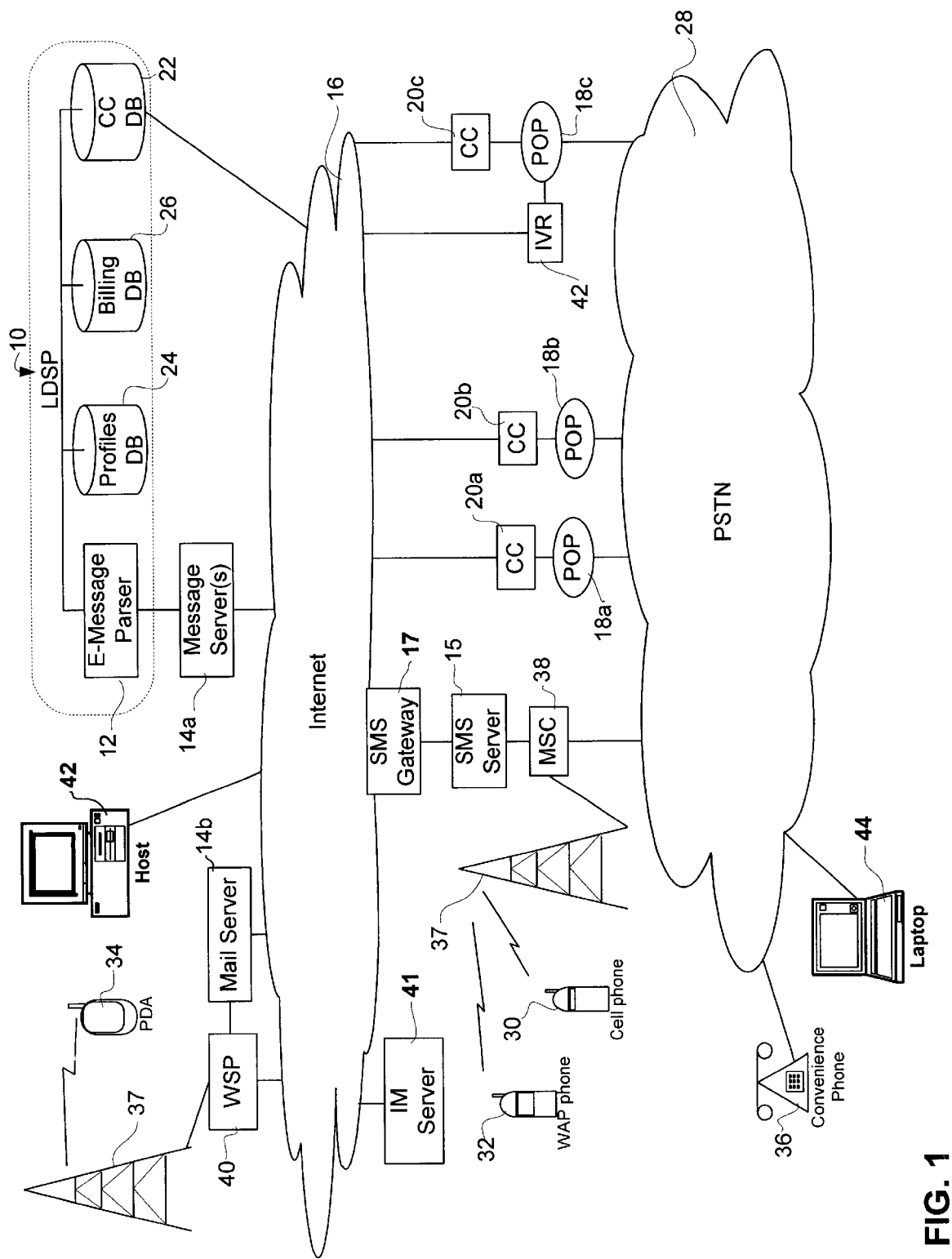
FIG. 1 is a schematic diagram illustrating principal components of a system in accordance with the invention shown in an exemplary deployment, as well as illustrating a few of the device types adapted to send electronic text messages to the system through the Internet and the Public Switched Telephone Network (PSTN)

FIG. 1 illustrates an exemplary deployment of a system for providing toll call service to customers who place toll call requests using a text messaging protocol, such as an electronic mail (e-mail), short message service (SMS) or instant message service (IMS). This permits toll call requests to be initiated from wireline and wireless devices that have access to one of those services but do not have access to, or do not support, a Worldwide Web browser. Such devices include, for example, Research In Motion's Blackberry®, and other e-mail enabled wireless devices; cell phones and Wireless Application Protocol (WAP) phones adapted to send and receive Short Message Service messages; certain wireless Personal Device Assistants (PDAs) adapted to send and receive Instant Messages; and wireline devices enabled to send e-mail or Instant Messages, but not permitted to run Web browsers.

As illustrated in FIG. 1, a long distance service provider (LDSP) 10 provides toll call services to customers who access the LDSP 10 through the Internet. As explained in Applicant's U.S. Pat. No. 6,188,683, which is incorporated herein by reference, the LDSP 10 provides toll call service by completing toll call requests sent through the Internet 16 using connections set up through the Public Switched Telephone Network (PSTN) 28. As described in Applicant's U.S. Pat. No. 6,188,683, the toll call requests are formulated using a Web browser (not illustrated) and sent through the Internet 16 to the LDSP 10.

In order to improve the convenience and utility of the service, the LDSP 10 in accordance with the invention is equipped with an electronic message parser 12 which receives electronic messages from one or more text message servers 14. The electronic text messages may be sent from any wireline or wireless device adapted to formulate and send a text message into the Internet 16. For example, cell phones and Wireless Application Protocol (WAP) devices, such as WAP phones 32, communicate wirelessly with mobile service center base stations 37 which relay signals to mobile switching centers 38. The mobile switching centers 38 are equipped with short message service (SMS) servers 15 which in turn relay the short text messages between SMS devices, and are further adapted to relay messages into the Internet via an SMS gateway 17. Likewise, Personal Device Assistants (PDAs) 34 communicate with wireless base stations 37 supported by wireless service providers 40. The PDAs 34, such as the Blackberry® from Research In Motion and the Palm VII® from 3Com Corporation, for example, are adapted to send e-mail messages which are transferred by wireless service provider equipment to mail servers 14b connected to the Internet.

In addition, Instant Message service used by wireless and wireline devices such as laptops 44 connected by dial-up access to Internet service providers (not shown) or hosts 42 such as personal computers directly or indirectly connected to the Internet use Instant Message services provided by instant message servers 41, to send peer-to-peer text messages in a manner well known in the art.

In accordance with the invention, any wireline or wireless device adapted to send an electronic text message into the Internet 16 can request a toll call from the LDSP 10. As will be explained below in some detail, when the LDSP 10 receives a text message requesting a toll connection, the E-message parser 12 transfers call completion information from the electronic text message into a call request template which is passed via an internal communications network to a call control database 22. The call control database verifies the eligibility of the requester to initiate the toll call and, if the requester is entitled to initiate the toll call, the call is written to a call queue as will be explained below in more detail. A plurality of call controllers 20a–20c systematically pool the call queue and retrieve calls for completion by Point of Presence (POP) switches 18a–18c. As will also be explained below in some detail, an intelligent peripheral, such as IVR 42c, may be used under certain circumstances to confirm the entitlement of a requester to place a toll call.

It should be understood that electronic text messages be used to originate calls from and terminate calls to any wireline or wireless terminal that can be accessed from the Public Switched Telephone Network. For example, convenience phones 36, such as pay phones, hotel phones, or any other public phone which can be dialed without the use of a switchboard operator, can be used to terminate or originate calls. Likewise, any wireless device, such as the cell phone 30 or the WAP phone 32 or any voice-enabled PDA 34 that can be accessed via the PSTN, can be used to originate or terminate calls using electronic text messages, as enabled by the invention.

Electronic Text Message Format

It will be understood by persons skilled in the art that in order to be interpreted, electronic text messages must conform to a predetermined format. As will be appreciated, the format for an electronic text message is essentially a matter of design choice. Nonetheless, each electronic text message must contain adequate information to permit the LDSP 10 to establish the desired toll call connection. An exemplary electronic text message format for electronic text messages is as follows:

Call request message format:

command; abort time; origination No.; destination No(s); Scheduled Call Date/Time; POP; Billing Code Account information request format:

command; paramters

The "command" listed above in bold text is mandatory and must be provided for every call or information request. The remainder of the information units are optional, and are used as required.

The command specifies the type of toll call (or information request) that is to be established by the LDSP 10. Exemplary commands are "c"; "cc"; "sc"; "scc" "c1"; c2"; "cc1"; "cc2"; "co1"; "cco1" etc. The "c" command is used to establish a Plain Old Telephone Service (POTS) two-party call. The "cc" command is used to establish a conference call between three or more parties. The "sc" command is used to establish a scheduled call and the "scheduled call date/time" is required to be provided in the electronic text message. The "scc" is used to establish a scheduled conference call. The "c#", "sc#", "cc#" and the "scc#" commands are used to originate calls between an origination/destination number pair specified in the customer profile, which is adapted to store a predetermined number of different origination/destination number pairs. Thus, for example a customer can program their customer profile so that "c1" establishes a call from their cell phone to their home phone. Consequently, an SMS message "c1" will establish the call, regardless of where the customer is roaming at the moment. The same rules apply to conference calls and the "cc#" can be used to initiate a conference call from a one of a predefined set of originating number/destination numbers groups in the customer profile.

In the customer profile, one of the originating numbers is designated as a default, but a predetermined number of other originating numbers may be stored by the customer. The remainder of the originating numbers are numbered sequentially from 1 and the "#" in the "co#" command indicates the particular originating number that is to be used to originate the call.

A "call0" command automatically connects the caller to a service help desk of the LDSP 10. The "sc0" command can also be used. It will automatically connect the caller to the help desk at the scheduled time.

The command can also be used to retrieve information in an electronic message response from the LDSP 10. Exemplary commands are "s" for "send" and "b" for "balance", thus "sb" returns a current balance on a prepaid or a credit account; "d" for details, thus "sd" returns details of the last call made; "c" for "current", thus "sdc" returns call details for the current month's call records to date, and "sdp" sends call record details for the previous month's calls, etc. The number of commands that can be used is a matter of design choice and is not limited by the examples provided above.

The optional abort time may be specified to avoid calls at an inconvenient time. Since not all forms of electronic text messaging can be relied on to deliver messages within a reasonable time, the "abort time" limits the window in which a call will be attempted. The abort time is preferably specified as "dd:mo:hh:mm, TimeZone". If an abort date is not specified, the date on which the message was sent, as indicated in the message header, is assumed. If the abort time has passed when the message is received, the message is discarded and a call aborted message is returned to the requester.

The optional origination No. information permits a requester to specify an originating number which is not stored in the user profile. The specification of an originating number which is not stored in the user profile initiates a special authentication procedure to determine the entitlement of the caller to place a call. In accordance with a preferred embodiment of the invention, the IVR 42 (FIG. 1) is used in the call authentication process, which will be explained below in some detail with reference to FIGS. 3 and 5.

The mandatory destination No(s). information is used to specify one or more destination numbers. If the "call" command is used, only one destination number may be specified. If, on the other hand, the "ccall" command is used, at least two destination numbers must be specified. Otherwise an error message is generated and the call request is discarded. The destination numbers may conform to any number plan format, and must be delimited by commas.

The Date/Time information is used for scheduled calls. Any type of call may be a scheduled call. Scheduled calls are calls that are processed at the scheduled time. The date/time is preferably specified as "dd:yy:mo:hh:mm, TimeZone". If a date is not specified, the current date is assumed. The time is preferably specified in 24-hour format, followed by a time zone indicator.

The POP (point of presence) information is used to indicate a particular point of presence from which the call is to be set up, as described in Applicant's copending U.S. patent application Ser. No. 09/709,343, referenced above.

The Billing Code is an optional field used to associate charges for the call with a particular billing code, as is well understood in the art.

As is apparent, the information contained in the electronic text message does not include a personal identifier of the calling party. The calling party is determined using information in the "from" field of the electronic text message. In the case of e-mail, the user is identified by the origination e-mail address, which is stored in the user profile database 24 (FIG. 1). In the case of an SMS message, the user is identified by the originating telephone number, which is stored in the "from" field of the SMS message. This telephone number must be among the originating numbers stored in the profile database 24. In the case of an instant message, the user is identified using the unique name of the sender. The unique name must likewise be stored in the profile database 24. Relying on sender information rather than a personal identifier helps minimize the potential for fraud.

Text Message Handling Overview

Figure 2:
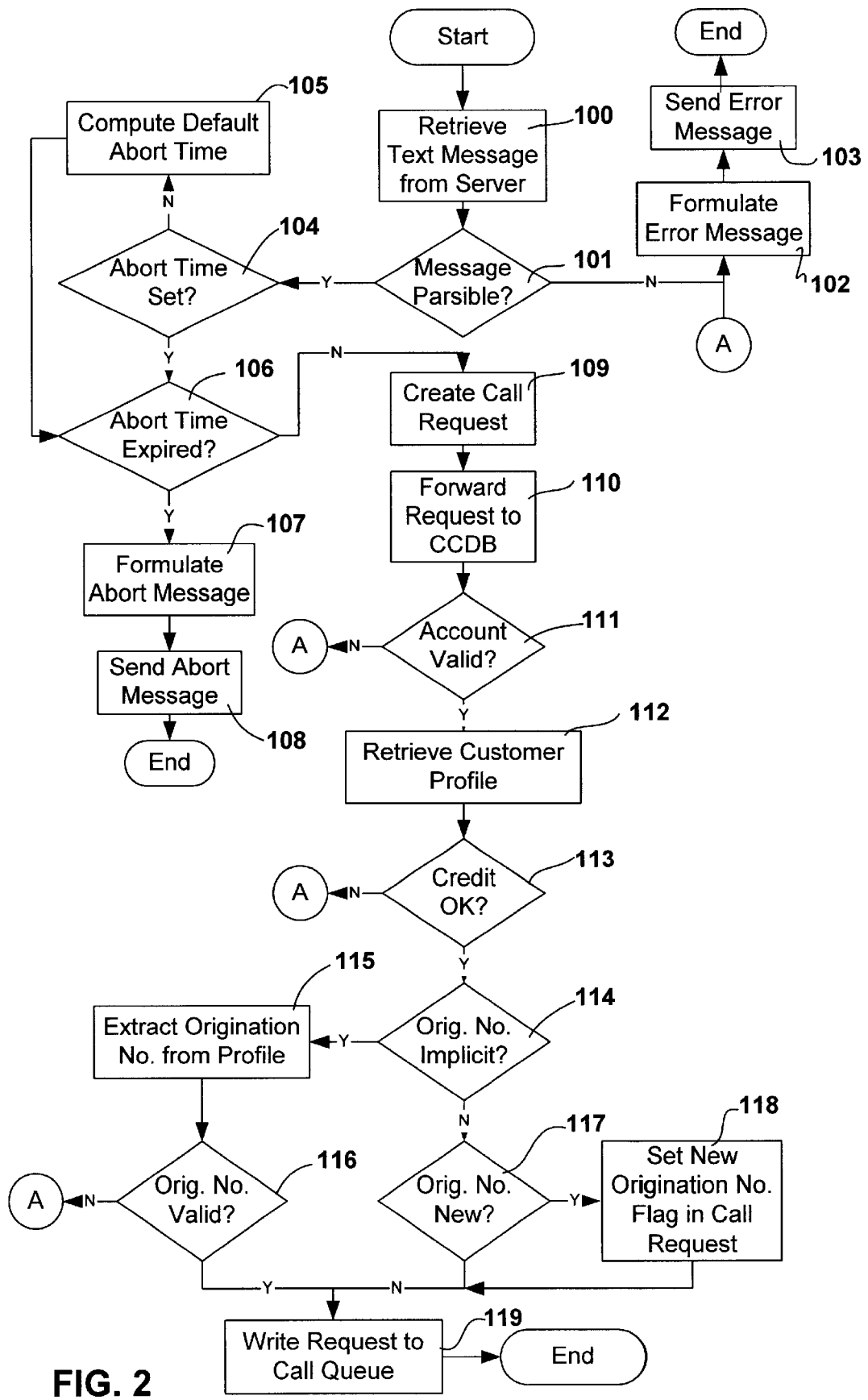
FIG. 2 is a flow chart illustrating principal steps performed by an electronic text message parser and a call control database in accordance with the invention.
Figure 3:
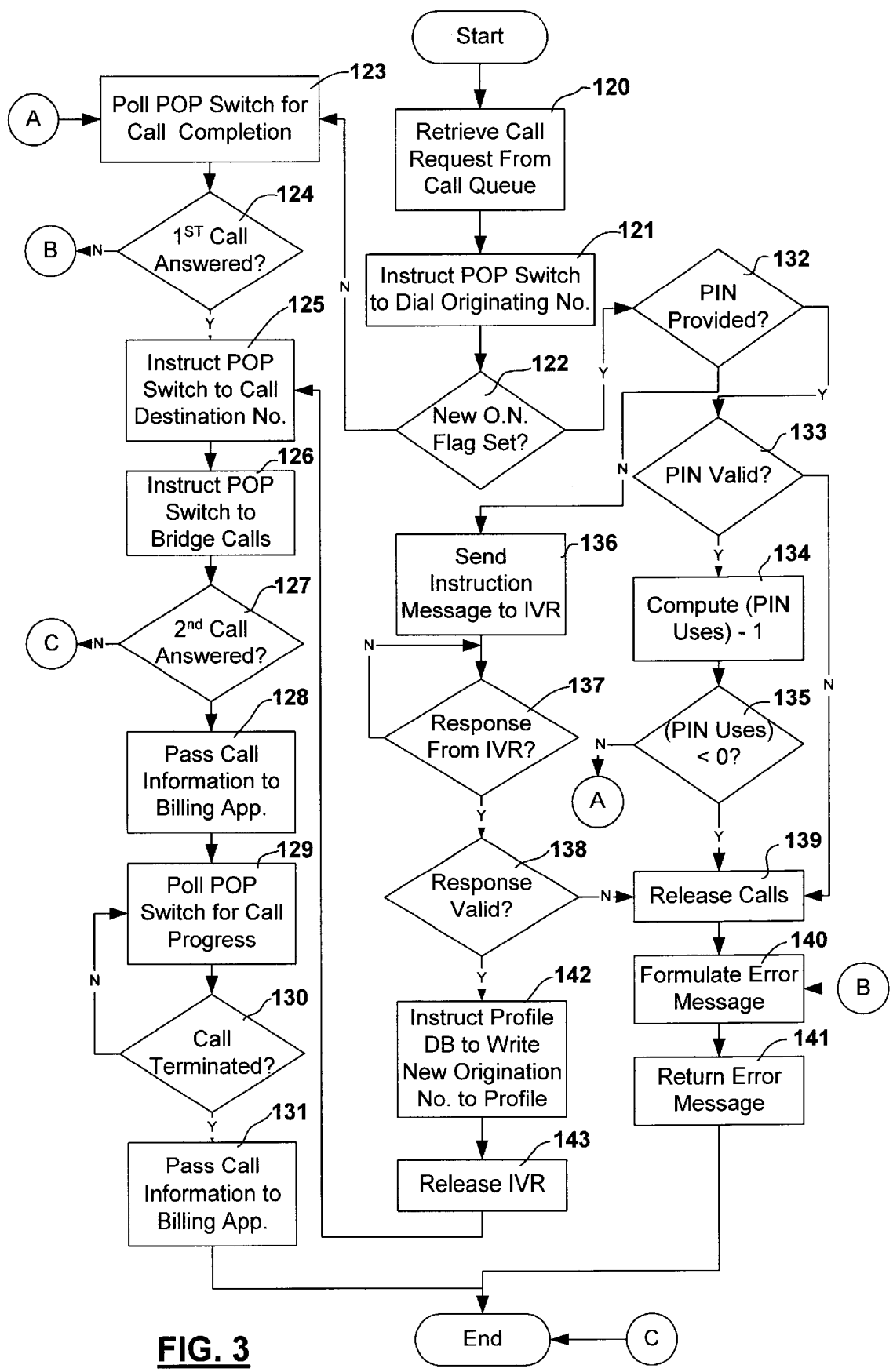
FIG. 3 is a flow chart illustrating principal steps performed by a call controller in accordance with the invention when a call request generated by receipt of an electronic text message is retrieved from a call queue.

FIGS. 2 and 3 are flow diagrams that provide a general overview of text message processing in a system in accordance with the invention. As shown in FIG. 2, an electronic text message is retrieved from one of the message servers 14a (FIG. 1) by the E-message parser 12 (step 100). The E-message parser 12 examines the delimited information in the electronic text message in step 101 to determine whether the message is parsable. If the information is incorrectly specified or critical information is missing, the E-message parser 12 formulates an error message (step 102) and sends the error message back to the requester in step 103. If the message is determined to be parsable, the E-message parser 12 checks (step 104) to determine if an "abort time" has been specified in the retrieved text message. As explained above, the abort time is used to ensure that a call is not completed at an inconvenient time. If an abort time has not been set, a default abort time is computed (step 105) using a "sent time" in the message header plus a default interval, such as 5 minutes, for example. In either case the abort time is compared to a system time to determine if the abort time has expired (step 106). If the abort time has expired, an abort message is formulated (step 107), and the abort message is returned to the requester in step 108.

If the abort message has not expired, the E-message parser 12 creates a call request by moving respective message components into a call request template (not shown) which is forwarded in step 109 to the call control database (CCDB) 22. At the call control database, the originator identity is extracted from the template and used as a key to search the profiles database 24 to determine whether the requester is a registered customer entitled to place the call (step 110). If a customer profile cannot be located, an error message is formulated in step 102 and the error message is sent back to the requester in step 103. Otherwise, the customer profile record is retrieved in step 112. Credit is checked in step 113 and if the subscriber lacks credit to place the call, the call control database 22 branches to steps 102 and 103. If the credit is acceptable, the template is examined to determine whether the originating number is explicit or implicit (step 114). The originating number is implicit if an originating number is not specified in the text message. In that case, the indicated originating number is extracted from the subscriber profile (step 115) and examined to determine whether the originating number extracted conforms to a known number plan (step 116). If the originating number extracted is blank or does not conform to any known number plan, the program branches to steps 102 and 103. Otherwise, a call request is written to the call queue in step 119. If the originating number is explicitly specified in the electronic text message, the originating number is checked against the originating number(s) stored in the customer profile (step 117). If the originating number is not new (located in the customer profile), the call request is written to the call queue (step 119). If it is determined in step 117 that the originating number is new, a new originating number flag is set in the call request at step 118 and the call request is written to the call queue in step 119.

FIG. 3 is a flow diagram showing principal steps performed by a call controller 20a, for example, when a call request is retrieved from the call queue written in step 119 of FIG. 2. In step 120, a call request is retrieved from the call queue by the call controller and the call controller instructs the POP switch 18a (FIG. 1) to dial the originating number specified in the call request (step 121). After the instruction is sent to the POP switch 18a, the call request is examined to determine whether the new originating number flag is set (step 122). If the new originating number flag is not set, the call controller 20a polls the POP switch to determine when the call to the originating number has been set up (step 123). After a predetermined time, the call controller determines whether the call to the originating number was answered (step 124). If the originating call is not answered, an error message is formulated in step 140 and the error message is returned to the requester in step 141. Otherwise, the call controller 20a instructs the POP switch to call the destination number (step 125). As soon as the call to the destination number is launched, the call controller 20a instructs the POP switch to bridge the two calls (step 126). This permits the calling party to hear ringing applied to the called party line. If the second call is not answered (step 127), the calling party will hang up which releases the first call and the process ends. If the second call is answered, call information is passed to the billing database 26 (FIG. 1) in step 128. Thereafter, the POP switch is polled for call progress in step 129 and in step 130 information retrieved by the poll is analyzed to determine whether the call has terminated. If the call has been not terminated, the POP switch is polled again after a predetermined time lapse. When the call terminates, call termination time and other information is passed to the billing database 26 (step 131) and the process is terminated.

If it was determined in step 122 that the new originating number flag was set, the call request is examined to determine if it contains a limited-use personal identification number (PIN). Limited-use PINs may be used by customers when they know that they will be traveling, for example. The limited-use PIN permits a caller to originate a call from a new originating number without challenge. The number of times the limited-use PIN can be used <PIN uses> is set by the customer, within a predefined range of, for example, 1–10. The customer enters the limited-use PIN in their profile using a Web interface, for example, to access the profiles database 24, and specifies the use limit, <PIN uses>. Thereafter, the customer can originate a call from any originating number if the PIN is correctly specified in the electronic text request message. If it is determined (step 132) that a PIN was provided, the PIN is compared with a limited use PIN stored in the customer profile record to determine if the PIN is valid (step 133). If the PIN is valid, one is subtracted from the <PIN uses> (step 134) and the result is examined (step 135) to determine if the result is less than zero. If the result is less than zero, the call is released in step 139, an error message is formulated (step 140) and sent (step 141). If the result is not less than zero, the processes branches to step 123 and proceeds as described above If it is determined in step 132 that a PIN was not provided, an alternate method for handling new originating numbers may be implemented. In accordance with the alternate method, an instruction message is sent from call controller 20a to the IVR 32 in step 136. The call controller then awaits a response from the IVR (step 137). When a response is received, the call controller determines whether the response is valid (step 138) by collecting information input to the IVR by the calling party and comparing that information with some corresponding information stored in the user profile. The information may be any alphanumeric string stored in the customer profile by the customer, including a digit sequence input to the IVR using a dial pad on a telephone. The specifications for the validation information are a matter of design choice. If the response is not valid, calls to the originating number and to the IVR are released in step 149, an error message is formulated (step 140) and the error message is returned to the requester in step 141. If the response is valid, the call controller preferably instructs the profile database to write the new originating number to the customer profile (step 142) so that the new originating number can be used for at least a predetermined period of time. Thereafter, the IVR is released in step 143 and the process progresses through steps 125–131 as described above. As will be understood by those skilled in the art, the overview of text message processing described above is related to a specific network configuration and electronic text messages may be processed in many other ways to achieve the same result.

Example Calls

Figure 4:
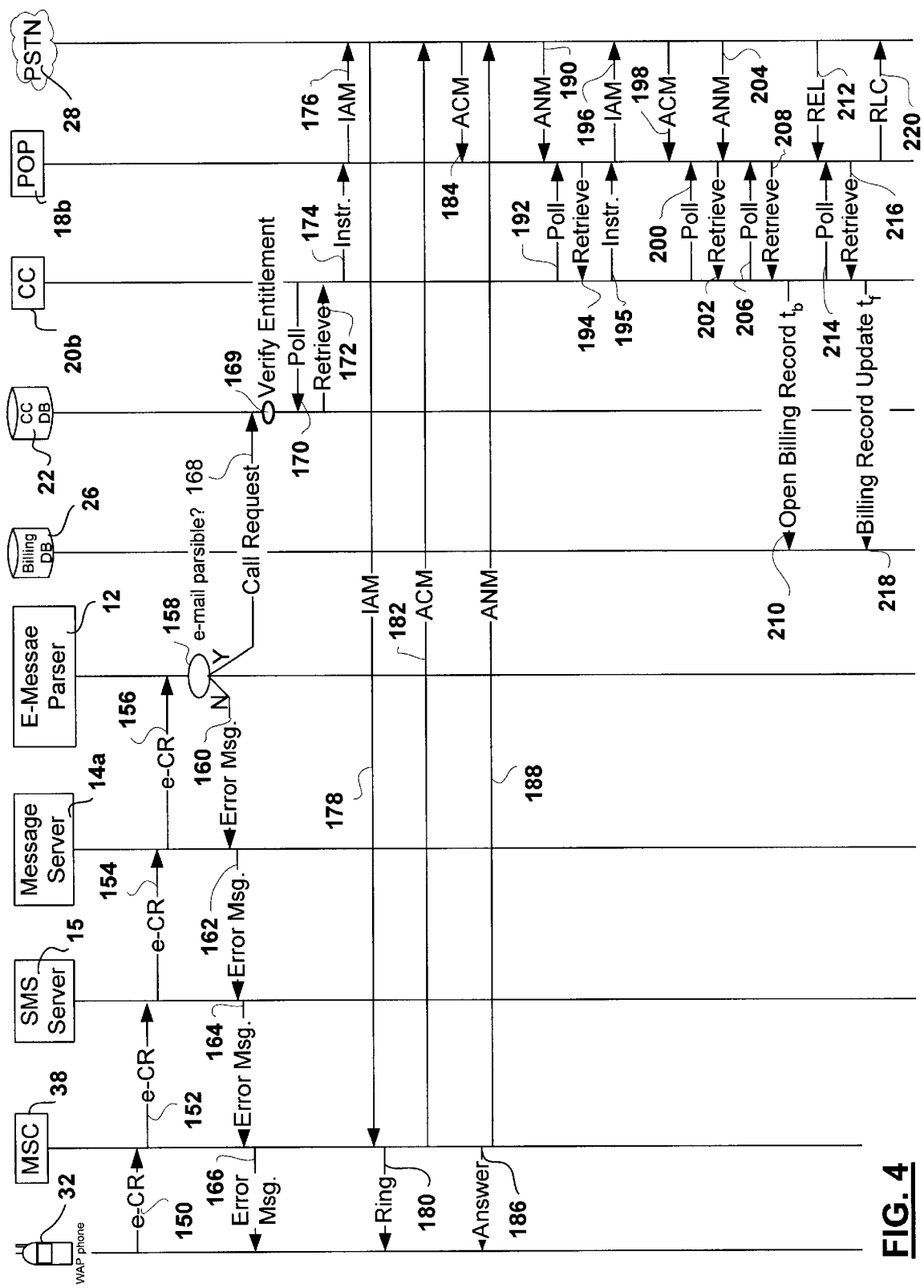
FIG. 4 is a call flow diagram illustrating principal steps in a successful attempt to establish a call connection in response to a correctly formatted electronic text connection request message.
Figure 5:
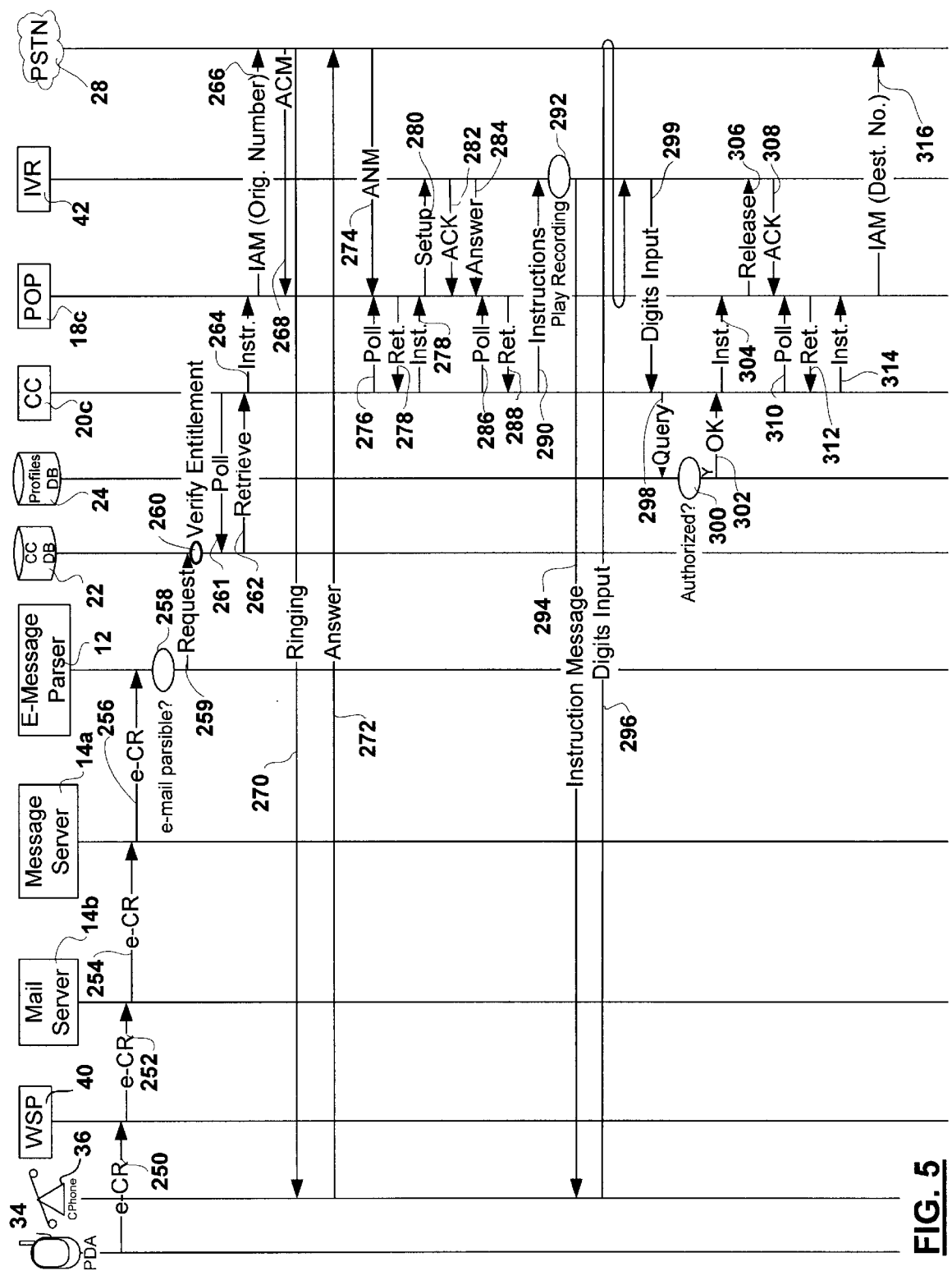
FIG. 5 is a call flow diagram illustrating principal steps in a successful attempt to establish a call connection to an origination directory number not found in a customer profile associated with a customer identified by information contained in an electronic text connection request message.
Figure 6:
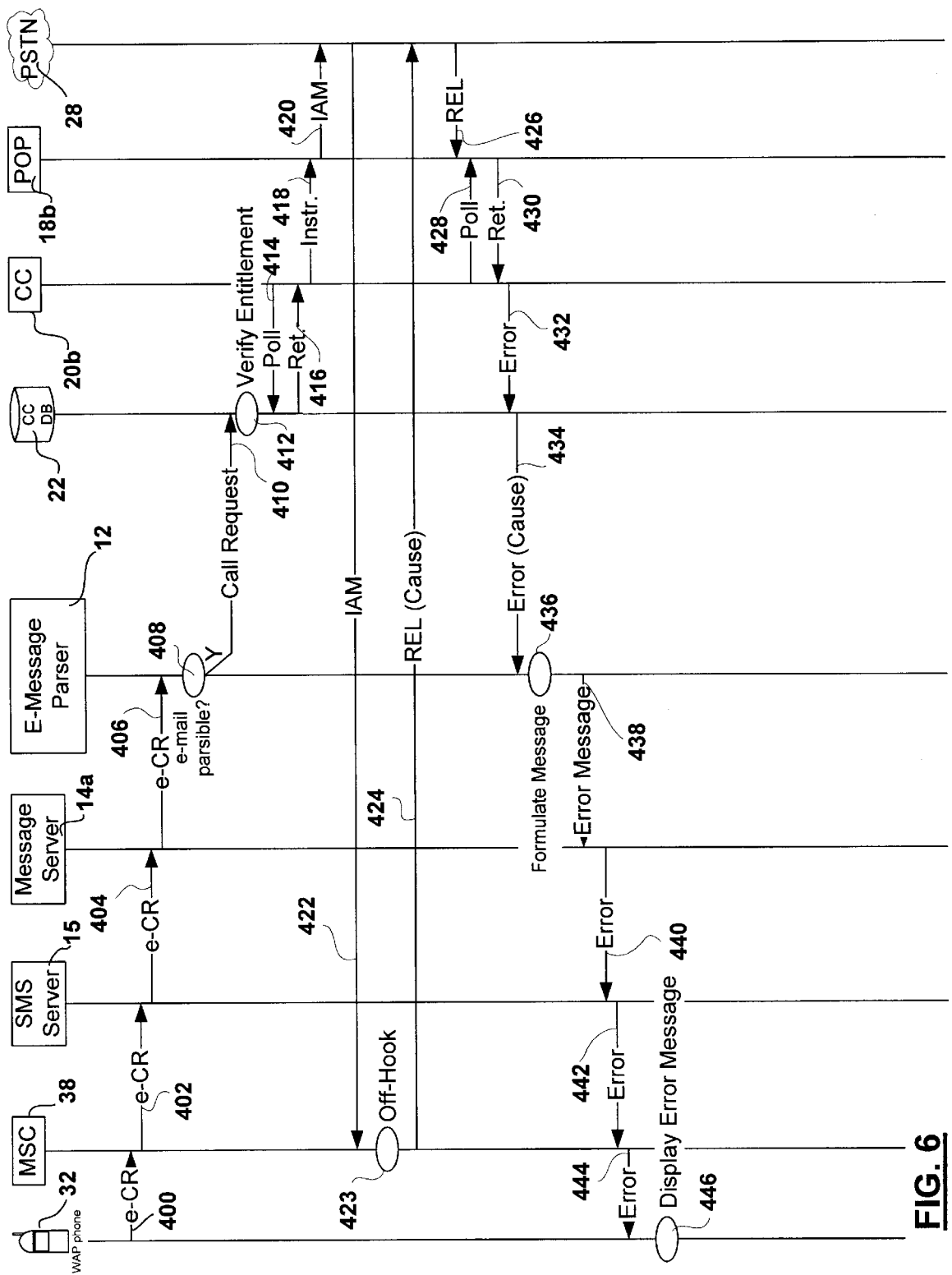
FIG. 6 is a call flow diagram illustrating principal steps in a failed attempt to establish a call connection in response to a correctly formatted electronic text connection request message.

FIGS. 4–6 are call flow diagrams that illustrate principal steps in exemplary calls established using the methods and system in accordance with the invention. FIG. 4 shows the completion and release of a two-party POTS call. At 150, a customer creates an electronic text message to initiate a call request and sends the message in step 150. MSC 38 receives the message and forwards it to the SMS server in step 152. The SMS server analyzes the message and forwards it into the Internet through the SMS gateway 17 (FIG. 1) to the message server 14a in step 154. The E-message parser 12 retrieves the message from the message server in step 156 and examines the electronic text message to determine whether it is parsable in step 158. If the message is determined not to be parsable, an error message is formulated and returned to the requesting customer in steps 160–166. If the e-mail message is determined to be parsable in step 158, a call request template is created and forwarded to the call control database in step 168. The call control database verifies the caller's entitlement to complete the call, as described above with reference to FIG. 2 (step 169). After verifying entitlement, the call control database unites a call request record to the call queue.

The call controller 20b polls (step 170) the call control queue on a regular basis and retrieves call requests written to the call queue (step 172). After the call request is retrieved, call controller 20b sends instructions (step 174) to the POP 18b instructing the POP 18b to set up a call connection to the originating number. The POP switch 18b therefore formulates a call setup message (an Integrated Services Digital Network User Part, ISUP) Initial Address Message (IAM), for example, and forwards the call setup message into the PSTN 28 (step 176) which forwards the message through the PSTN to the MSC 38 (step 178). On receipt of the IAM, the MSC 38 applies ringing (step 180) to the WAP device 32 and returns an Address Complete (ACM) message through the PSTN to the POP switch 18b (steps 182, 184). Thereafter, the WAP device 32 is answered in step 186 which causes the MSC 38 to generate an Answer (ANM) message that is sent in steps 188, 190 through the PSTN to the POP switch 18b. The Call Control node periodically polls (step 192) the POP switch 18b to determine call status and retrieves the call status in step 194. The information retrieved informs the call controller 20b that the first call to the requester is completed. Call controller 20b therefore sends instructions (step 195) to prompt the POP switch 18b to place a call to the destination number. The call to the destination number is set up, as described above, in steps 196–204 to the destination number served by the PSTN. For sake of clarity, the destination station is not illustrated. The call controller 20b continues to periodically poll the POP switch 18b and to retrieve call completion information as shown in steps 200–208. After the retrieve at 208, the call controller determines that the called station has been answered and sends an information record to the billing database 26 instructing that the billing record be opened for the call (step 210). Polling (not shown) is conducted at regular intervals to determine when the call is released. As shown at 212, the called party goes on hook which sends a release message back to the POP switch 18b, which acknowledges with a Release Complete (RLC) in step 220. After the Call Control node determines that the call has been released by retrieving information in step 216, the call controller records the time and sends the time information to the billing database 26 (step 218).

FIG. 5 is a call flow diagram illustrating principal messages exchanged between users of a PDA 34, PDA service provider equipment 40, 16b and components of the system in accordance with the invention. The customer using the PDA 34 sends an e-mail or an instant message to the system in accordance with the invention, requesting that a telephone call be originated from a convenience phone 36, a pay phone for example. The e-mail message is received by the wireless service provider 40 in step 250 and forwarded to the wireless service mail server 14b in step 252. The mail server forwards the electronic text message in step 254 to the E-message server 14a. The message parser retrieves the message in step 256 and determines in step 258 whether the message is parsable, i.e. the message includes the minimum required information in an acceptable format with required delimiters. In this example, the message is parsable and the message contents are copied into a template that is forwarded in step 259 to the call control database 22. The call control database examines the contents of the template in step 260 to verify the entitlement of the customer to make the call, as explained above with reference to FIG. 2. After verification, a call request is formulated and written to the call queue, as explained above.

The call controller 20a periodically polls the call queue (step 261) and retrieves the call request (step 262). In response to the call request, the call controller 20a passes instructions to POP 18a (step 264) instructing the POP 18a to establish a connection with the convenience phone 36. The POP 18a responds by formulating an ISUP IAM, for example, which is forwarded through the PSTN 26 to an SSP (not shown) that serves the convenience phone 36 (step 266). The SSP returns a ACM message (step 268) and applies ringing (step 270) to the convenience phone 36. The convenience phone is answered by the requester (step 272). On answer, an ANM is returned to the POP 18a (step 274). Meanwhile, the call controller 20a periodically polls (step 276) the POP 18a to determine status of the call, and retrieves the answer status in step 278.

The POP 20c which is connected to the IVR 42 by an ISDN Private Rate Interface (PRI) sends an ISDN setup message in step 280. The IVR 42 responds with an Acknowledge message (step 282) and an Answer message (step 284). Meanwhile, the call controller 20c polls (step 286) the POP switch for progress of the connection and retrieves information indicating that the IVR has answered the call (at 288). The call controller 20a sends a message through a TCC/IP connection (step 290), for example, to the IVR 42 instructing the IVR 42 to query the customer for verification information, as explained above with reference to FIG. 3. The message is heard by the requester at the convenience phone (step 294). In response, the customer at the convenience telephone inputs digits, for example, using a dial pad of the telephone. The digits are representative of encrypted information previously stored in the customer's profile by the customer. The digits are captured by the IVR (step 296). The IVR 42 returns the input at 297 via the TCP/IP connection. The Call Control node formulates a query message which is sent (at 298) to the profile's database 24, which compares the input to the previously stored information in the subscriber profile to determine whether the customer is authorized to place the call from a new originating number.

In this example, the authorization check is valid and approval is returned at 302 to the call controller 20c. The call controller 20c therefore issues instructions at 304 to release the IVR 42 and the POP 18c sends a ISDN Release message in step 306 which is acknowledged at 308. If, however, the authorization check had failed, the IVR 42 is preferably programmed to request the information from the customer at least one more time and the process is repeated (not shown). If after a repeated attempt the information still does not match the stored information in the customer profile, the call is terminated and an error message is preferably sent to both the customer PDA 34 and to a management workstation of the LDSP 10 to report the failed authorization attempt.

Meanwhile the call controller polls at 310 and determines at 312 that the release of the IVR 42 has been effected. Instructions are therefore are sent at 314 to connect to the destination number specified by the customer in step 250.

The POP 18c responds by formulating an IAM, for example, which is forwarded into the PSTN (step 316). Thereafter, call setup is completed to the destination as described above with reference to FIG. 4.

FIG. 6 is a call flow diagram illustrating actions of the system when call completion fails. In this example, call completion fails because the customer becomes unavailable, for example, by receiving another call after the electronic message request is sent. As shown in FIG. 6, an electronic message in the form of a SMS message is sent from a WAP device 32 in step 400 and is propagated to the E-message parser 12 in steps 402–406, where it is parsed in step 408. The information is extracted from the electronic text message and inserted into a template which is forwarded to the call control database 22 in step 410. The call control database 22 verifies entitlement of the customer in step 412 and writes a record to the call queue as described above. Call controller 20b retrieves the record in steps 414 and 416. The controller responds to the call request by formulating instructions that are forwarded to POP 18b (at 418). The POP 18b responds in step 420 by forwarding an IAM, for example, into the PSTN to connect to the requester's WAP device 32 (step 422). The MSC 38 checks availability of the WAP device (step 423) and determines that it is off-hook. The MSC 28 therefore returns an ISUP REL message with Cause in step 424, in a manner well known in the art. The Release with Cause is forwarded to POP 18b in step 426. The Call Control node checking on the status of the connection to the requesting party retrieves the Release with Cause in steps 428 and 430. The Call Control node therefore formulates an error message which is returned in steps 432, 434 to the E-message parser 12 which formulates an E-message in step 436 and returns the error message in steps 438–444 to the WAP device 32, which displays the error message at 446.

The method and system in accordance with the invention therefore provide a powerful and convenient tool to permit users of wireless and wireline devices to establish calls from substantially any PSTN termination using electronic text messages. As will be understood by those skilled in the art, the above examples show one potential implementation of the system in accordance with the invention. Many variations on the implementation of the system are feasible.

The embodiments of the invention described above are therefore intended to be exemplary only. The scope of the invention is therefore intended to be limited solely by the scope of the appended claims.

We claim:

1. A method of providing toll telephone service, comprising steps of:
    a) receiving an electronic text message sent to a predetermined address by a customer who wishes to initiate a toll call between an originating number and at least one destination number;
    b) parsing the electronic text message to extract information to permit the toll call to be initiated; and
    c) initiating the toll call using the information extracted from the electronic text message; wherein the electronic text messages are any one of electronic mail messages; short message service messages; and, instant text messages.

2. A method as claimed in claim 1 wherein the step of parsing further comprises steps of:
    a) examining the electronic text message to determine if the electronic text message conforms to at least one predefined format; and
    b) if the electronic text message does not conform to the at least one predefined format, formulating a reply message containing an error statement to report to the customer that the call request cannot be initiated.

3. A method as claimed in claim 2 wherein the step of parsing further comprises a step of examining delimited portions of the electronic text message to determine whether respective delimited portions of the electronic text message conform to a specification for contents of the respective delimited portions.

4. A method as claimed in claim 1 further comprising steps of:
    a) inserting the extracted information into a connection request message; and
    b) forwarding the connection request message to a call control database, which performs logical operations to determine whether the customer is entitled to initiate the toll call.

5. A method as claimed in claim 4 further comprising a step of determining whether an abort time has been specified in the electronic text message, and aborting the toll call if the abort time has been specified and the abort time has elapsed.

6. A method as claimed in claim 5 further comprising a step of sending an abort message to the customer to inform the customer that the toll call request was aborted.

7. A method as claimed in claim 5 further comprising a step of computing a default abort time if an abort time has not been specified, and aborting the toll call if the computed abort time has elapsed.

8. A method as claimed in claim 7 further comprising a step of computing the abort time by adding a predetermined time interval to a sent time extracted from a header of the electronic text message.

9. A method as claimed in claim 4 further comprising steps of:
    a) extracting a customer account identifier from the electronic text message; and
    b) using the customer account identifier to search customer profile records for a valid customer account record, to determine whether the electronic text message originated from a customer authorized to initiate the call request.

10. A method as claimed in claim 9 further comprising a step of determining whether the customer has prearranged credit to cover a cost of the toll call, and formulating an electronic text response denying the toll call request if the customer does not have the prearranged credit.

11. A method as claimed in claim 4 further comprising steps of:
    a) examining the information to determine whether an originating number has been explicitly specified;
    b) if an originating number has not been explicitly specified, using a customer account identifier included in the electronic text message to retrieve a customer profile record; and
    c) using a default originating number specified in the customer profile record to initiate the call.

12. A method as claimed in claim 4 further comprising steps of:
    a) examining the information to determine whether an originating number has been implicitly specified;
    b) if an originating number has been implicitly specified, using a customer account identifier included in the electronic text message to retrieve a customer profile record; and
    c) using the customer profile record and an implicit specification in the electronic text message to retrieve an originating number from the customer profile record to initiate the call.

13. A method as claimed in claim 11 wherein the step of using further comprises a step of using the customer profile and the implicit specification in the text message to retrieve an originating number/destination number pair to initiate the call.

14. A method as claimed in claim 11 wherein the step of using further comprises a step of using the customer profile and the implicit specification in the text message to retrieve an originating number/destination number group to initiate a conference call.

15. A method as claimed in claim 4 wherein initiating the call using the information extracted from the electronic text message comprises steps of:
 a) passing instructions to a telephone switch instructing the telephone switch to initiate a first call to an originating number implicitly or explicitly specified in the electronic text message;
 b) if the call to the originating number is answered, instructing the telephone switch to complete a second call to a destination number implicitly or explicitly specified in the electronic text message; and
 c) instructing the telephone switch to bridge together the first and second telephone calls.

16. A method as claimed in claim 15 wherein if the electronic text message specifies more than destination number, the method further comprises steps of:
 a) instructing the telephone switch to complete a telephone call to respective ones of the more than one destination numbers; and
 b) as respective ones of the telephone numbers are called, instructing the telephone switch to bridge the respective telephone calls to the first and second telephone calls.

17. A method as claimed in claim 11 wherein if the originating number is explicitly specified, the method further comprises steps of:
 a) extracting a customer account identifier from the electronic text message;
 b) using the customer account identifier to retrieve a customer profile record; and
 c) verifying that the explicitly specified originating number is one in a list of originating numbers specified in the customer profile record.

18. A method as claimed in claim 11 wherein if the electronic text message includes a personal identification number (PIN) and an originating number, the method further comprises steps of:
 d) extracting a customer account identifier from the electronic text message;
 e) using the customer account identifier to retrieve a customer profile record;
 f) verifying that the PIN is stored in the customer profile record, and completing the call to the originating number.

19. A method as claimed in claim 18 further comprising a step of prior to completing the call to the originating number, determining whether the number of uses of the PIN has exceeded a predefined limit before completing the call, and only completing the call if the number of uses has not been exceeded.

20. A method as claimed in claim 17 wherein if the originating number is not one in the list of originating numbers specified in the customer profile record, the method further comprises steps of:
 a) placing a first call to the originating number;
 b) when the first call is answered, placing a second call to a device adapted to collect information from a party who answers the call to the originating number;
 c) bridging the first and second calls, and operating the device to request that an authorization code be input by the party; and
 d) comparing the authorization code input to an authorization code stored in the customer profile record.

21. A method as claimed in claim 20 wherein if the step of comparing determines that the authorization codes match, the method further comprises a step of:
 e) releasing the call to the device;
 f) placing a third call to the destination number specified in the electronic text message; and
 g) bridging the first and third calls together.

22. A method as claimed in claim 20 wherein if the step of comparing determines that the authorization codes do not match, the method further comprises a step of:
 g) operating the device to play a message to announce that the authorization codes did not match and inviting a re-input of the authorization code; and
 h) comparing the re-input authorization code to the authorization code stored in the customer profile record.

23. A method as claimed in claim 22 wherein if the step of comparing again determines that the authorization codes do not match, the method further comprises a step of:
 i) operating the device to play a message to announce that the authorization codes did not match and informing the party that the call will be terminated; and
 j) releasing the first and second calls.

24. A method as claimed in claim 23 further comprising a step of sending a message to the customer and the long distance service provider to inform each that an attempt to place a call from a new originating number failed because the authorization code was not input correctly.

25. A system for providing long distance telephone service, comprising:
 a) an electronic text message parser that receives an electronic text message from a customer that wishes to place a toll call, and parses the electronic text message to extract information required to set up the toll call; and
 b) toll call origination equipment that receives the information and places the toll call for the customer; wherein the electronic text messages are any one of electronic mail messages; short message service messages; and, instant text messages.

26. A system as claimed in claim 23 wherein the electronic text message parser is adapted to parse electronic text message to determine whether the electronic text message conforms to at least one predetermined format, and to formulate a response to the electronic text message if the electronic text message does not conform to the at least one predetermined format.

27. A system as claimed in claim 25 wherein the electronic text parser is adapted to parse delimited portions of the electronic text message to determine whether the respective delimited portions conform to respective predetermined specifications, and to formulate a response to the electronic text message if the respective delimited portions not conform to the predetermined specifications.

28. A system as claimed in claim 25 wherein the electronic text parser is adapted to pass the extracted information to the toll call origination equipment in a connection request message.

29. A system as claimed in claim 25 wherein the toll call origination equipment comprises;
- a call control database for receiving the connection request message and examining the extracted information to determine whether the information is complete, and to verify the entitlement of the customer to place the call;
- a call controller for receiving call connection instructions related to the toll call from the call control database; and
- a telephone switch connected to a switched telephone network, the telephone switch being adapted to receive instructions from the call controller, to establish first and second calls in response to the instructions, and to bridge together the first and second calls.

* * * * *